(12) United States Patent
Lin et al.

(10) Patent No.: US 12,330,987 B1
(45) Date of Patent: Jun. 17, 2025

(54) METHOD FOR IMPROVING DEFORMABILITY OF CEMENTITIOUS COMPOSITE BY USING POLYETHYLENE TEREPHTHALATE POWDER

(71) Applicant: Guangdong University of Technology, Guangzhou (CN)

(72) Inventors: Jiaxiang Lin, Guangzhou (CN); Ruihao Luo, Guangzhou (CN); Jiashi Wu, Guangzhou (CN); Minna Dong, Guangzhou (CN); Liuyi Liu, Guangzhou (CN); Zhiying Zhou, Guangzhou (CN); Jinghui Lyu, Guangzhou (CN); Guowei Ruan, Guangzhou (CN); Yongchang Guo, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/019,920

(22) Filed: Jan. 14, 2025

(30) Foreign Application Priority Data

Jan. 22, 2024 (CN) .......................... 202410086778.2

(51) Int. Cl.

| | | |
|---|---|---|
| *C04B 16/06* | (2006.01) | |
| *C04B 7/02* | (2006.01) | |
| *C04B 14/06* | (2006.01) | |
| *C04B 18/08* | (2006.01) | |
| *C04B 24/32* | (2006.01) | |
| *C04B 28/04* | (2006.01) | |
| *C04B 40/00* | (2006.01) | |
| *C04B 103/30* | (2006.01) | |
| *C04B 103/32* | (2006.01) | |
| *C04B 103/44* | (2006.01) | |
| *C04B 103/50* | (2006.01) | |

(52) U.S. Cl.
CPC ............ *C04B 16/0625* (2013.01); *C04B 7/02* (2013.01); *C04B 14/06* (2013.01); *C04B 18/08* (2013.01); *C04B 24/32* (2013.01); *C04B 28/04* (2013.01); *C04B 40/0046* (2013.01); *C04B 2103/302* (2013.01); *C04B 2103/32* (2013.01); *C04B 2103/44* (2013.01); *C04B 2103/50* (2013.01); *C04B 2201/20* (2013.01); *C04B 2201/50* (2013.01)

(58) Field of Classification Search
CPC ....... C04B 16/0625; C04B 7/02; C04B 14/06; C04B 18/08; C04B 24/32; C04B 28/04; C04B 40/0046; C04B 2103/302; C04B 2103/32; C04B 2103/44; C04B 2103/50; C04B 2201/20; C04B 2201/50
See application file for complete search history.

(56) References Cited

U.S. PATENT DOCUMENTS

| | | |
|---|---|---|
| 2013/0012625 A1 | 1/2013 | Li et al. |
| 2017/0088463 A1 | 3/2017 | Alqahtani |

FOREIGN PATENT DOCUMENTS

| | | |
|---|---|---|
| CN | 101343162 A | 1/2009 |
| CN | 103011694 A | 4/2013 |
| CN | 104193220 A | 12/2014 |
| CN | 109678432 A | 4/2019 |
| CN | 113493330 A | 10/2021 |
| CN | 115959865 A | 4/2023 |
| JP | 2002356354 A | 12/2002 |
| KR | 20180010529 A | 1/2018 |

OTHER PUBLICATIONS

Bao Cong, et al., Flexural toughness and damping property of recycled PET plastic aggregate mortar Acta Materiae Compositae Sinica, Apr. 14, 2023, pp. 2343-2354, vol. 40.No. 4 doi: 10.13801/j.cnki.fhclxb.20220623.002 Claims involved: 1-10.

Wang Hailong,Luo Yuejing,Peng Guangyu,Sun Xiaoyan,Ying Qiming Effect of Admixtures on Tensile Behavior of Fiber Reinforced Cementitious Composites Journal of Southwest Jiaotong University, Feb. 15, 2017, pp. 61-68, vol. 52.No. 1 doi: 10.3969/j.issn.0258-2724.2017.01.009 Claims involved: 1-6.

Min Ook Kim, et al., Influence of PolyethyleneTerephthalate Powder on Hydration of Portland Cement Polymers, Jul. 31, 2021, pp. 1-9, vol. 13, .No. 15, 2551 doi: 10.3390/polym13152551 Claims involved: 1-6.

Retrieval report—First search dated Jun. 12, 2024 in SIPO application No. 202410086778.2.

Retrieval report—Supplementary search dated Aug. 1, 2024 in SIPO application No. 202410086778.2.

Notification to Grant Patent Right for Invention dated Aug. 9, 2024 in SIPO application No. 202410086778.2.

Notice of first Office action dated Jun. 17, 2024 in SIPO application No. 202410086778.2.

*Primary Examiner* — Anthony J Green
(74) *Attorney, Agent, or Firm* — Pilloff Passino & Cosenza LLP; Rachel K. Pilloff; Sean A. Passino (57) ABSTRACT

A method for improving deformability of a cementitious composite by using PET powder is provided. The aggregate in the cementitious composite is replaced with PET powder at a volume replacement ratio of 0-25%, and the value of the volume replacement ratio is not 0%. The method including following steps: mixing components of the raw materials to obtain the cementitious composite.

6 Claims, 8 Drawing Sheets

METHOD FOR IMPROVING DEFORMABILITY OF CEMENTITIOUS COMPOSITE BY USING POLYETHYLENE TEREPHTHALATE POWDER

CROSS-REFERENCE TO RELATED APPLICATIONS

This application claims priority to Chinese Patent Application No. 202410086778.2, filed on Jan. 22, 2024, the contents of which are hereby incorporated by reference.

TECHNICAL FIELD

The present disclosure relates to the field of design and preparation of cementitious composites, and in particular relates to a method for improving deformability of a cementitious composite by using polyethylene terephthalate (PET) powder.

BACKGROUND

The treatment of urban wastes has always been a thorny global environmental problem, and plastic is the main part of urban wastes. According to the report released by the United Nations Environment Programme in 2023, the global annual output of plastics exceeds 430 million tons, two-thirds of which are short-term plastic products that will soon become wastes. According to statistics, only 9% of these plastic wastes are reused.

Waste plastic bottles made of polyethylene terephthalate (PET) are one of the important plastic wastes. PET is non-biodegradable. In order to deal with these difficult to degrade PET plastic wastes, the conventional waste disposal methods include burying the wastes directly outside the landfill site or using alternative incineration-related methods. However, these treatment methods have many shortcomings. Landfilling plastics take decades or even hundreds of years to decompose and may also cause toxic substances to seep into the ground. Burning plastics will release chemical additives and greenhouse gases into the atmosphere, causing serious environmental pollution and endangering human health.

Using PET wastes in other industrial fields is an effective way to deal with these wastes, especially in the construction industry where a large amount of PET wastes is consumed. Therefore, researchers have been committed to adding PET wastes as reinforcement in concrete manufacturing process to consume PET wastes many years ago. However, in most studies, PET was mixed into concrete as fiber with the fiber volume content of only 0.3% to 2.0%, so there are very few PET plastic wastes used in this way. Obviously, mixing PET into concrete only in the form of fiber is not effective in treating a large amount of PET wastes. A better approach is to make PET into a substitute for the main raw material of concrete, so as to add a large amount of PET into concrete to consume PET wastes.

Moreover, due to the acceleration of urbanization, the global concrete output has increased rapidly. It is well known that natural aggregate is one of the main raw materials for producing concrete, and about 60-75% of the components of concrete and mortar are natural aggregate. As the main raw material for preparing concrete, the demand of natural aggregate has risen sharply, resulting in a shortage of natural aggregate and a continuous rise in prices, seriously affecting the development of construction industry. In addition, sand mining activities have also increased, resulting in a sharp decrease in natural ore and river sand, which has a huge impact on the ecological environment. Therefore, using recycled aggregate instead of natural aggregate is of great significance to the construction industry and sustainable development.

On the other hand, conventional concrete, as a quasi-brittle material, has been difficult to meet the performance requirements of some projects. In the field of building materials, researchers add fiber to concrete to make engineered cementitious composite (ECC). ECC may enhance the ductility of concrete and effectively improve the defects of conventional concrete, making ECC a current research hotspot in building materials. However, ECC also has some shortcomings: due to the negative impact of excessive fiber on the strength, workability, and cost of concrete, only a low content of fiber (1% to 2% by volume) may be added to concrete, thus limiting the ductility growth of ECC.

In view of this, the present disclosure is proposed.

SUMMARY

An objective of the present disclosure is to provide a method for improving deformability of a cementitious composite by using PET powder, so as to solve the problems existing in the prior art and the problems that the existing concrete consumes a large amount of natural aggregate and has weak ductility.

In order to achieve the above objectives, the present disclosure provides the following solution.

The present disclosure provides a method for improving deformability of a cementitious composite by using PET powder, where the aggregate in the cementitious composite is replaced with PET powder at a volume replacement ratio of 0-25%, and the value of the volume replacement ratio is not 0%.

In an embodiment, the aggregate is quartz powder.

In an embodiment, particle size grades of the PET powder and the aggregate are the same.

The present disclosure also provides a cementitious composite based on PET powder, consisting of following raw materials in terms of unit volume mass:
cement 936.7 kilograms per cubic meter (kg/m$^3$);
fly ash 401.4 kg/m$^3$;
quartz powder 301.1-401.4 kg/m$^3$;
PET powder 0-52.3 kg/m$^3$;
water 335.1 kg/m$^3$;
water reducer 5.4 kg/m$^3$;
polyethylene (PE) fiber 19.4 kg/m$^3$;
thickener 0.54 kg/m$^3$; and
defoamer 2.01 kg/m$^3$,
where the dosage of the PET powder is not 0 kg/m$^3$.

In an embodiment, the cement is P.II 52.5R ordinary portland cement.

In the present disclosure, the particle size of the fly ash (mainly composed of $SiO_2$, $Al_2O_3$, FeO, $Fe_2O_3$, CaO, etc.) is 0-200 micrometers (μm). Adding fly ash may fill the pores in concrete, improve the compactness and impermeability of concrete, reduce the corrosion problem of concrete and improve the durability of concrete.

In an embodiment, the PE fiber (ultra-high molecular weight polyethylene fiber (UHMWPE fiber)) has a length of 18 millimeters (mm), a diameter of 24 μm, a density of 0.97 gram per cubic centimeter (g/cm$^3$), a tensile strength of 3000 megapascal (MPa), an elastic modulus of 116 Gigapascal (GPa) and an elongation of 1-3%.

In an embodiment, the water reducer is a polycarboxylate ether superplasticizer.

In an embodiment, the defoamer is a polyether modified silicon defoamer.

In an embodiment, the particle sizes of the quartz powder and the PET powder are 20-310 μm. Optionally, quartz powder has an average particle size of 120 μm and a density of 2.68 $g/cm^3$. Optionally, PET powder has a density of 1.38 $g/cm^3$ and an average particle size of 107 μm.

The present disclosure may solve the following problems.

The present disclosure may improve the deformability of cementitious composite. PET powder has plastic deformation characteristics, enabling it to absorb and disperse stress energy through the deformation of PET during the loading process of the specimen. This energy absorption function is helpful to improve the deformability of ECC under tensile load and enhance the ultimate tensile strain performance of ECC.

The present disclosure may deal with the durability problem. PET powder will not be corroded by alkaline substances in cement matrix, thus improving the corrosion resistance of concrete and prolonging the service life of concrete structure.

The present disclosure may reduce the dead weight of concrete. Compared with most natural aggregates, PET powder has lighter weight and lower density, thus reducing the density of concrete.

The present disclosure may save resources and improve environmental benefits. Replacing natural aggregate with recycled PET powder may reduce the consumption of natural resources, thus reducing the consumption of resources, which is beneficial to environmental protection and sustainable development.

The present disclosure also provides a preparation method of the cementitious composite, including following steps:

mixing components of the raw materials to obtain the cementitious composite.

In an embodiment, the preparation method of the cementitious composite includes following steps:

mixing the cement, the fly ash, the quartz powder, the PET powder, the thickener and the defoamer to obtain a mixed material;

mixing the water with the water reducer to obtain a mixed slurry; and adding the mixed slurry into the mixed material, and then adding the PE fiber, and uniformly mixing to obtain the cementitious composite.

The concrete mixing device used in the preparation process of the cementitious composite is optionally a mortar planetary mixer for mixing.

The more specific preparation steps are as follows.

Firstly, cement, fly ash, quartz powder, PET powder, thickener and defoamer are added into a mixer and stirred at a low speed for 2-3 minutes (min) to uniformly mix the dry materials. Subsequently, the water and water reducer mixed uniformly in advance are added while mixing at a low speed for 1 min, and then the mixture is mixing at a low speed for 3 min, and then mixed at a high speed for 1 min to make the mixture uniform into slurry. Then, fiber is added while mixing at a low speed for 3 min, followed by low-speed mixing for 4 min and high-speed mixing for 4-5 min to uniformly disperse the fiber. The whole mixing process takes about 13-15 min.

Finally, the mixed concrete is quickly put into the mold and vibrated to eliminate the bubbles in the specimens and make the specimens dense, and the flowability test is completed at the same time. After pouring is completed, the specimens are covered with a film to prevent water evaporation, demoulded after 24 hours of indoor curing, and normally cured in a sealed environment for 28 days, and then the specimens are taken out for mechanical properties test.

Optionally, before the PE fiber is put into the concrete mixer, the fiber is uniformly dispersed by a high-pressure air gun to reduce the clustering phenomenon of the PE fiber and make the fiber disperse more uniformly in the concrete.

Optionally, after adding the PE fiber, the mixing is stopped every 1 min, and the fiber entangled on the fan blades is separated from the fiber agglomerated in the slurry, so that the fiber may be uniformly dispersed in the concrete.

The present disclosure may improve the deformability of cementitious composite by using PET powder, and the prepared cementitious composite may be used in the following aspects.

Bridges and building structures: the cementitious composite may effectively resist the expansion of cracks and improve the seismic performance of structures.

Underground structure: the cementitious composite may reduce cracks caused by foundation settlement and vibration, and provide additional durability and safety.

Repair and reinforcement of aging concrete structure: the cementitious composite may reinforce and repair damaged parts by using the excellent ductility and bonding performance.

Marine engineering: the cementitious composite has corrosion resistance and durability.

Prefabricated components: the cementitious composite may improve the crack resistance and durability of components.

The present disclosure reduces the consumption of natural aggregate resources, and the obtained cementitious composite has the advantages of high deformability, good durability, good economic benefit, environmental friendliness and the like.

The present disclosure discloses the following technical effects.

The present disclosure provides a method for improving deformability of a cementitious composite by using PET powder in view of the current situation that the utilization amount of PET is not high, the ductility of common ECC is limited, and excessive consumption of natural aggregate will cause ecological problems. The present disclosure may effectively solve the problems that the existing concrete preparation consumes a large amount of natural aggregate and has weak ductility, and may effectively recycle the waste PET plastic.

The method according to the present disclosure may obviously improve the deformability of concrete, thereby improving the service life and safety performance of concrete. Moreover, the method may realize the high-value utilization of a large amount of PET waste and reduce the environmental damage caused by the exploitation of natural aggregate resources. The method is a potential means to solve the problems of natural aggregate shortage and PET waste treatment, and has certain complementarity from the economic and ecological aspects.

BRIEF DESCRIPTION OF THE DRAWINGS

In order to explain the embodiments of the present disclosure or the technical solution in the prior art more clearly, the drawings needed in the embodiments will be briefly introduced below. Apparently, the drawings in the following description are only some embodiments of the present disclosure. For one of ordinary skill in the art, other drawings may be obtained according to these drawings without creative effort.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. Intermediate values within any stated value or stated range, as well as each smaller range between any other stated value or intermediate values within the stated range are also included in the present disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein may also be used in the practice or testing of the present disclosure. All documents mentioned in this specification are incorporated by reference to disclose and describe methods and/or materials related to the documents. In case of conflict with any incorporated document, the contents of this specification shall prevail.

It is apparent to those skilled in the art that many improvements and changes may be made to the specific embodiments of the present disclosure without departing from the scope or spirit of the present disclosure. Other embodiments will be apparent to the skilled person from the specification of the present disclosure. The description and embodiments of the present disclosure are exemplary only.

The terms "including", "comprising", "having" and "containing" used in this article are all open terms, which means including but not limited to.

In the following embodiments of the present disclosure, the flowability test flow of concrete mixture is carried out by jumping table test according to GB/T 2419, and the mixture width in two vertical directions is measured after the mixture stops flowing.

Figure 4:
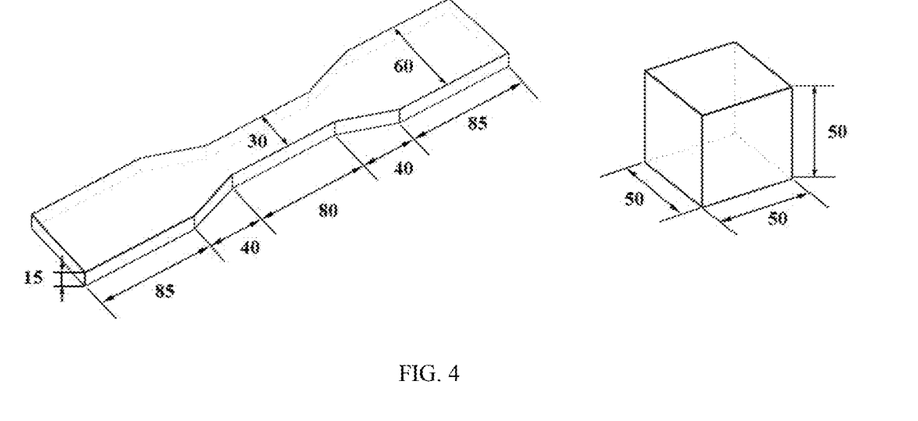
FIG. 4 is a dimension diagram of specimens in embodiments of the present disclosure.

The dimensions of the concrete mixture specimens obtained in the embodiments are a cube of 50 mm×50 mm×50 mm and a dog bone shape of 330 mm×60 mm×13 mm, and the shapes are shown in FIG. 4.

The cement used in the embodiments of the present disclosure is P.II 52.5R ordinary portland cement. The water reducer used is polycarboxylate ether superplasticizer.

The PE fiber (UHMWPE fiber) used in the embodiments of the present disclosure has a length of 18 mm, a diameter of 24 μm, a density of 0.97 g/cm$^3$, a tensile strength of 3000 MPa, an elastic modulus of 116 GPa and an elongation of 1-3%. The density of quartz powder used is 2.68 g/cm$^3$, and the density of PET powder is 1.38 g/cm$^3$.

The main component of the thickener used in the embodiments of the present disclosure is methyl cellulose, and the defoamer is polyether modified silicon defoamer.

Figure 1:
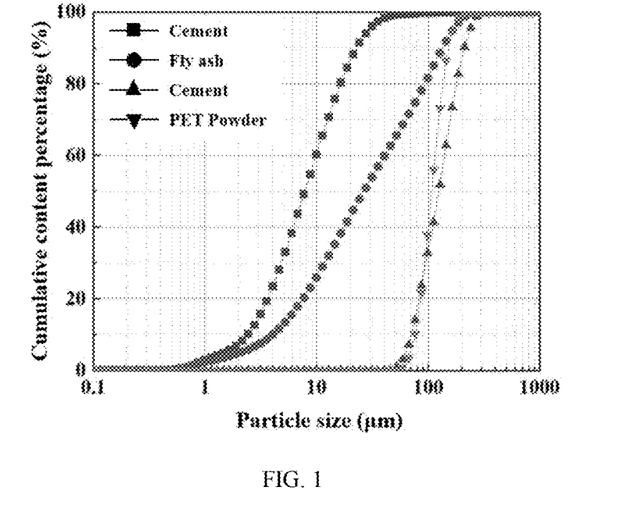
FIG. 1 shows particle size distribution curves of raw materials in embodiments of the present disclosure.

The particle size distribution curves of raw materials in the embodiments of the present disclosure are shown in FIG. 1.

Embodiment 1

According to a cementitious composite with PET powder replacing quartz powder at a 0% replacement ratio, the raw material ratio (material usage of 1 cubic meter (m$^3$) concrete) is shown in Table 1:

TABLE 1

| Mix proportion design of cementitious composite (kg/m$^3$) | | | | | | | | |
|---|---|---|---|---|---|---|---|---|
| Cement | Fly ash | Quartz powder | PET powder | Water | Water reducer | PE fiber | Thickener | Defoamer |
| 936.7 | 401.4 | 401.4 | 0.0 | 335.1 | 5.4 | 19.4 | 0.54 | 2.01 |

The preparation method is as follows:
(1) adding cement, fly ash, quartz powder, thickener and defoamer into a concrete mixer, and mixing at a low speed of 75 revolutions per minute (rpm) for 3 min to uniformly mix dry materials to obtain a concrete powder premix;
(2) adding water and water reducer which are mixed uniformly in advance while mixing at a low speed (75 rpm) for 1 min, and then mixing at a low speed (75 rpm) for 3 min, and then mixing at a high speed (135 rpm) for 1 min to make the mixture uniform into slurry, thus obtaining a flowing matrix;
(3) adding PE fiber while mixing at a low speed (75 rpm) for 3 min, and then mixing at a low speed (75 rpm) for 4 min, and mixing at a high speed (135 rpm) for 5 min to uniformly disperse the fiber to obtain concrete slurry; and
(4) quickly pouring the mixed concrete into the mold (making three cubes and three dog bones, and pouring six specimens in total), vibrating with a vibration table to eliminate bubbles in the specimens to make the specimens compact, and completing the flowability test. The specimens are covered with a film to prevent water evaporation, and then demoulded after 24 hours of indoor curing, and normally cured for 28 days in a sealed environment. After the expiration, the specimens are taken out for mechanical properties test.

Embodiment 2

According to a cementitious composite with PET powder replacing quartz powder at a 5% replacement ratio, the raw material ratio (material usage of 1 m³ concrete) is shown in Table 2:

TABLE 2

| Mix proportion design of cementitious composite (kg/m³) | | | | | | | | |
|---|---|---|---|---|---|---|---|---|
| Cement | Fly ash | Quartz powder | PET powder | Water | Water reducer | PE fiber | Thickener | Defoamer |
| 936.7 | 401.4 | 381.3 | 10.5 | 335.1 | 5.4 | 19.4 | 0.54 | 2.01 |

Figure 2:
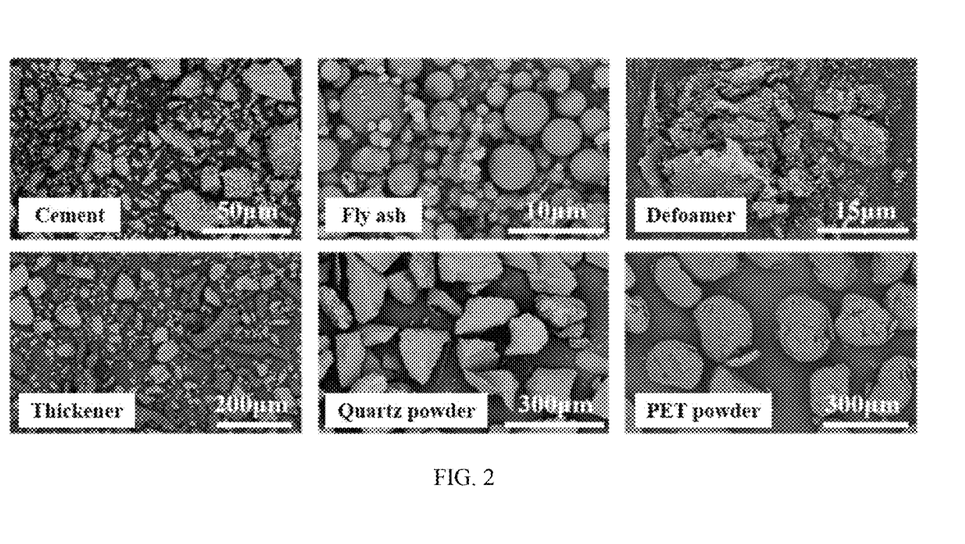
FIG. 2 shows electron microscope images of raw materials in embodiments of the present disclosure.
Figure 3:
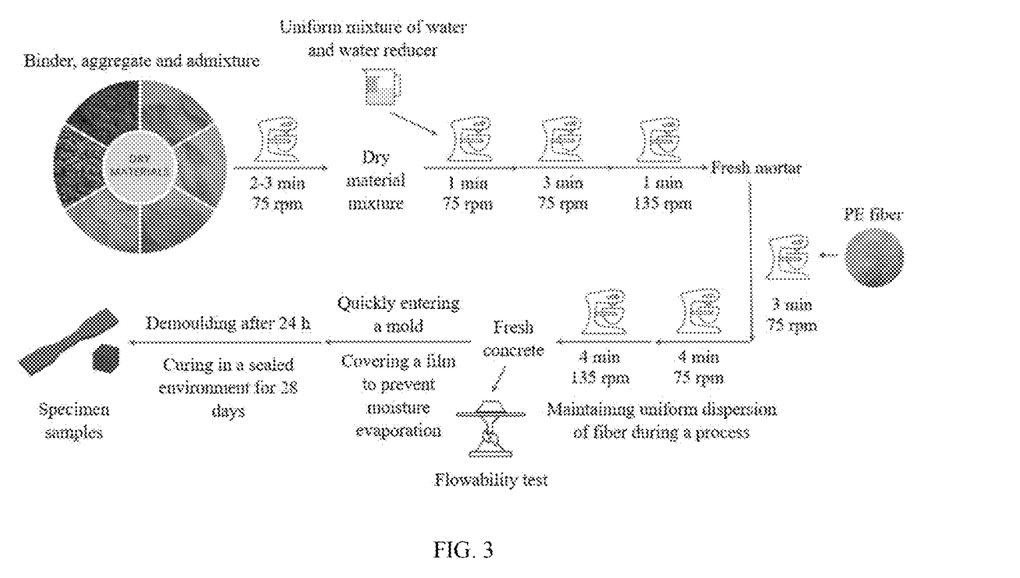
FIG. 3 is a mixing flow chart of concrete samples in embodiments of the present disclosure.

The preparation method is as follows, as shown in FIG. 3:
(1) adding cement, fly ash, quartz powder, PET powder, thickener and defoamer (as shown in FIG. 2) into a concrete mixer, and mixing at a low speed of 75 rpm for 3 min to uniformly mix dry materials to obtain a concrete powder premix (dry material mixture);
(2) adding water and water reducer which are mixed uniformly in advance while mixing at a low speed (75 rpm) for 1 min, and then mixing at a low speed (75 rpm) for 3 min, and then mixing at a high speed (135 rpm) for 1 min to make the mixture uniform into slurry, thus obtaining a flowing matrix (fresh mortar);
(3) adding PE fiber while mixing at a low speed (75 rpm) for 3 min, and then mixing at a low speed (75 rpm) for 4 min, and mixing at a high speed (135 rpm) for 4 min to uniformly disperse the fiber to obtain concrete slurry; and
(4) quickly pouring the mixed concrete into the mold (making three cubes and three dog bones, and pouring six specimens in total), vibrating with a vibration table to eliminate bubbles in the specimens to make the specimens compact, and completing the flowability test. The specimens are covered with a film to prevent water evaporation, and then demoulded after 24 hours of indoor curing, and normally cured for 28 days in a sealed environment. After the expiration, the specimens are taken out for mechanical properties test.

Embodiment 3

According to a cementitious composite with PET powder replacing quartz powder at a replacement ratio of 10%, the raw material ratio (material usage of 1 m³ concrete) is shown in Table 3:

TABLE 3

| Mix proportion design of cementitious composite (kg/m³) | | | | | | | | |
|---|---|---|---|---|---|---|---|---|
| Cement | Fly ash | Quartz powder | PET powder | Water | Water reducer | PE fiber | Thickener | Defoamer |
| 936.7 | 401.4 | 361.3 | 20.9 | 335.1 | 5.4 | 19.4 | 0.54 | 2.01 |

The preparation method is as follows:
(1) adding cement, fly ash, quartz powder, PET powder, thickener and defoamer into a concrete mixer, and mixing at a low speed of 75 rpm for 3 min to uniformly mix dry materials to obtain a concrete powder premix (dry material mixture);
(2) adding water and water reducer which are mixed uniformly in advance while mixing at a low speed (75 rpm) for 1 min, and then mixing at a low speed (75 rpm) for 3 min, and then mixing at a high speed (135 rpm) for 1 min to make the mixture uniform into slurry, thus obtaining a flowing matrix (fresh mortar);
(3) adding PE fiber while mixing at a low speed (75 rpm) for 3 min, and then mixing at a low speed (75 rpm) for 4 min, and mixing at a high speed (135 rpm) for 4 min to uniformly disperse the fiber to obtain concrete slurry; and
(4) quickly pouring the mixed concrete into the mold (making three cubes and three dog bones, and pouring six specimens in total), vibrating with a vibration table to eliminate bubbles in the specimens to make the specimens compact, and completing the flowability test. The specimens are covered with a film to prevent water evaporation, and then demoulded after 24 hours of indoor curing, and normally cured for 28 days in a sealed environment. After the expiration, the specimens are taken out for mechanical properties test.

Embodiment 4

According to a cementitious composite with PET powder replacing quartz powder at a replacement ratio of 15%, the raw material ratio (material usage of 1 m³ concrete) is shown in Table 4:

TABLE 4

Mix proportion design of cementitious composite (kg/m³)

| Cement | Fly ash | Quartz powder | PET powder | Water | Water reducer | PE fiber | Thickener | Defoamer |
|---|---|---|---|---|---|---|---|---|
| 936.7 | 401.4 | 341.2 | 31.4 | 335.1 | 5.4 | 19.4 | 0.54 | 2.01 |

The preparation method is as follows:
(1) adding cement, fly ash, quartz powder, PET powder, thickener and defoamer into a concrete mixer, and mixing at a low speed of 75 rpm for 3 min to uniformly mix dry materials to obtain a concrete powder premix (dry material mixture);
(2) adding water and water reducer which are mixed uniformly in advance while mixing at a low speed (75 rpm) for 1 min, and then mixing at a low speed (75 rpm) for 3 min, and then mixing at a high speed (135 rpm) for 1 min to make the mixture uniform into slurry, thus obtaining a flowing matrix (fresh mortar);
(3) adding PE fiber while mixing at a low speed (75 rpm) for 3 min, and then mixing at a low speed (75 rpm) for 4 min, and mixing at a high speed (135 rpm) for 4 min to uniformly disperse the fiber to obtain concrete slurry; and
(4) quickly pouring the mixed concrete into the mold (making three cubes and three dog bones, and pouring six specimens in total), vibrating with a vibration table to eliminate bubbles in the specimens to make the specimens compact, and completing the flowability test. The specimens are covered with a film to prevent water evaporation, and then demoulded after 24 hours of indoor curing, and normally cured for 28 days in a sealed environment. After the expiration, the specimens are taken out for mechanical properties test.

Embodiment 5

According to a cementitious composite with PET powder replacing quartz powder at a replacement ratio of 20%, the raw material ratio (material usage of 1 m³ concrete) is shown in Table 5:

TABLE 5

Mix proportion design of cementitious composite (kg/m³)

| Cement | Fly ash | Quartz powder | PET powder | Water | Water reducer | PE fiber | Thickener | Defoamer |
|---|---|---|---|---|---|---|---|---|
| 936.7 | 401.4 | 321.1 | 41.8 | 335.1 | 5.4 | 19.4 | 0.54 | 2.01 |

The preparation method is as follows:
(1) adding cement, fly ash, quartz powder, PET powder, thickener and defoamer into a concrete mixer, and mixing at a low speed of 75 rpm for 3 min to uniformly mix dry materials to obtain a concrete powder premix (dry material mixture);
(2) adding water and water reducer which are mixed uniformly in advance while mixing at a low speed (75 rpm) for 1 min, and then mixing at a low speed (75 rpm) for 3 min, and then mixing at a high speed (135 rpm) for 1 min to make the mixture uniform into slurry, thus obtaining a flowing matrix (fresh mortar);
(3) adding PE fiber while mixing at a low speed (75 rpm) for 3 min, and then mixing at a low speed (75 rpm) for 4 min, and mixing at a high speed (135 rpm) for 4 min to uniformly disperse the fiber to obtain concrete slurry; and
(4) quickly pouring the mixed concrete into the mold (making three cubes and three dog bones, and pouring six specimens in total), vibrating with a vibration table to eliminate bubbles in the specimens to make the specimens compact, and completing the flowability test. The specimens are covered with a film to prevent water evaporation, and then demoulded after 24 hours of indoor curing, and normally cured for 28 days in a sealed environment. After the expiration, the specimens are taken out for mechanical properties test.

Embodiment 6

According to a cementitious composite with PET powder replacing quartz powder at a replacement ratio of 25%, the raw material ratio (material usage of 1 m³ concrete) is shown in Table 6:

TABLE 6

Mix proportion design of cementitious composite (kg/m³)

| Cement | Fly ash | Quartz powder | PET powder | Water | Water reducer | PE fiber | Thickener | Defoamer |
|---|---|---|---|---|---|---|---|---|
| 936.7 | 401.4 | 301.1 | 52.3 | 335.1 | 5.4 | 19.4 | 0.54 | 2.01 |

The preparation method is as follows:

(1) adding cement, fly ash, quartz powder, PET powder, thickener and defoamer into a concrete mixer, and mixing at a low speed of 75 rpm for 3 min to uniformly mix dry materials to obtain a concrete powder premix (dry material mixture);

(2) adding water and water reducer which are mixed uniformly in advance while mixing at a low speed (75 rpm) for 1 min, and then mixing at a low speed (75 rpm) for 3 min, and then mixing at a high speed (135 rpm) for 1 min to make the mixture uniform into slurry, thus obtaining a flowing matrix (fresh mortar);

(3) adding PE fiber while mixing at a low speed (75 rpm) for 3 min, and then mixing at a low speed (75 rpm) for 4 min, and mixing at a high speed (135 rpm) for 4 min to uniformly disperse the fiber to obtain concrete slurry; and (4) quickly pouring the mixed concrete into the mold (making three cubes and three dog bones, and pouring six specimens in total), vibrating with a vibration table to eliminate bubbles in the specimens to make the specimens compact, and completing the flowability test. The specimens are covered with a film to prevent water evaporation, and then demoulded after 24 hours of indoor curing, and normally cured for 28 days in a sealed environment. After the expiration, the specimens are taken out for mechanical properties test.

Figure 5:
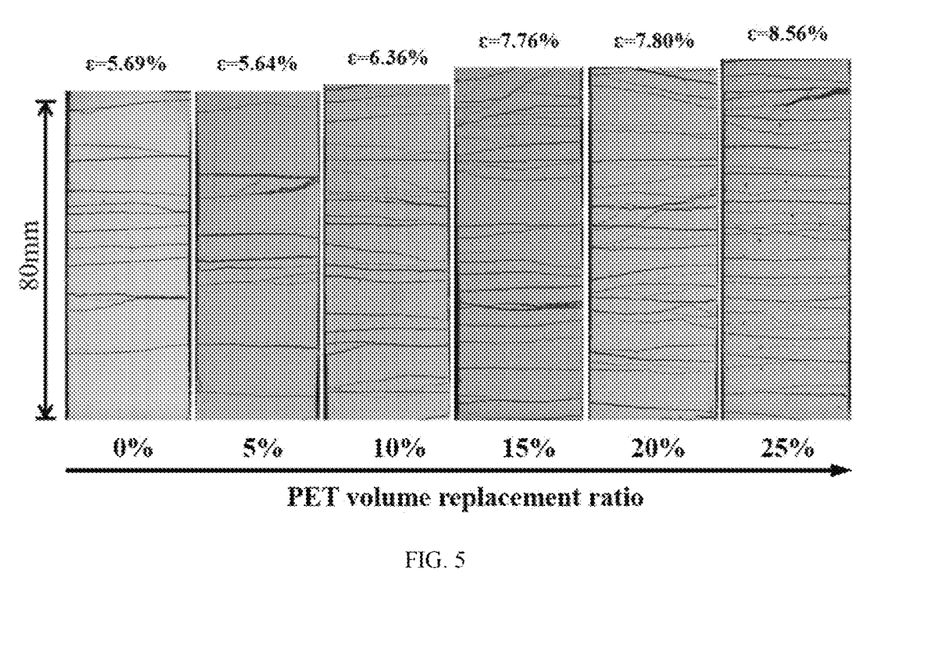
FIG. 5 shows specimen failure modes of axial tensile tests in embodiments of the present disclosure.
Figure 6:
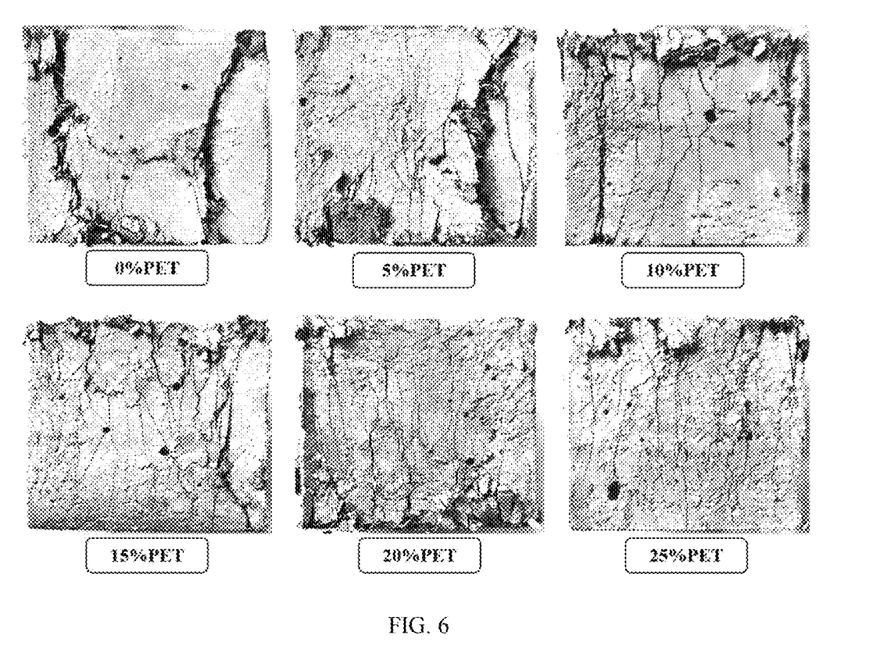
FIG. 6 shows specimen failure modes of axial compression tests in embodiments of the present disclosure.
Figure 7:
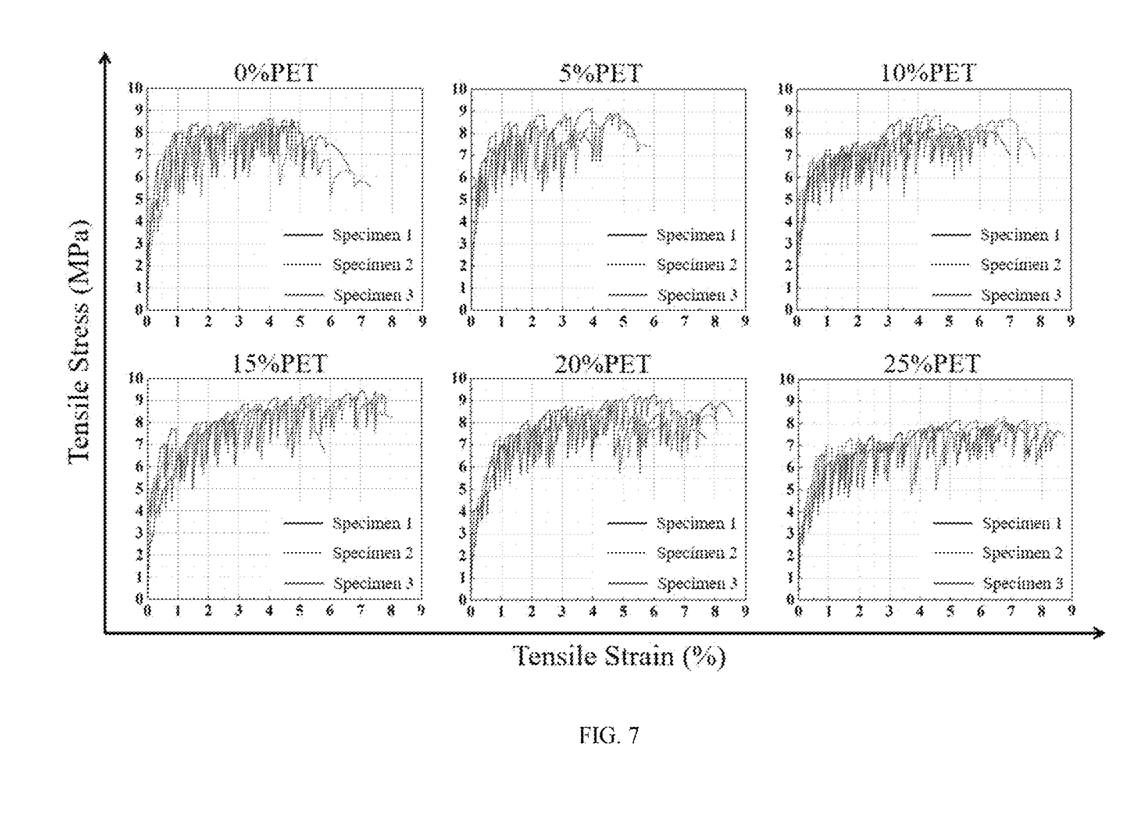
FIG. 7 shows stress-strain curves of axial tensile tests in embodiments of the present disclosure.

Samples of concrete specimens obtained in the above Embodiment 1-Embodiment 6 are subjected to axial tensile tests (experimental data including tensile strength and peak tensile strain) and axial compression tests (data including compressive strength) respectively, and the test results are shown in Table 7 and FIG. 5-FIG. 7.

The axial tensile tests of concrete dog bone specimens are carried out according to Japan Society of Civil Engineering (JSCE) specification, and are loaded by electronic universal testing machine. The loading mode is stretching in displacement control mode, and the loading rate is 0.5 millimeter per minute (mm/min). The axial strain of the 80 mm area in the middle of each of the specimens is measured by two symmetrical displacement meters, and the stress sensor and displacement meter are combined to assist in collecting data.

The compressive strength σm of concrete cube specimens is tested according to the Standard for test method of mechanical properties on ordinary concrete GB/50081-2002, and is obtained from cube compression tests, and the compressive strength of 50 mm×50 mm×50 mm cubes is measured. In this experiment, YAW-5000 microcomputer controlled electro-hydraulic servo pressure testing machine MATEST material testing machine is used, and the loading rate is 1800 Newton per second (N/s). Compressive strength is calculated according to the following formula:

$$\sigma m = F/A,$$

where F is the force value recorded by the testing machine, and A is the stressed cross-sectional area.

TABLE 7

| Sample | PET volume replacement ratio/% | Flowability/ mm | Tensile strength/ MPa | Peak tensile strain/% | Compressive strength/ MPa |
|---|---|---|---|---|---|
| Embodiment 1 | 0 | 175 | 8.53 (0.12) | 3.71 (0.40) | 98.2 (2.0) |
| Embodiment 2 | 5 | 183 | 8.92 (0.18) | 3.69 (1.04) | 100.8 (1.3) |
| Embodiment 3 | 10 | 192 | 8.78 (0.28) | 5.22 (1.50) | 95.2 (1.3) |
| Embodiment 4 | 15 | 199 | 9.12 (0.32) | 6.16 (0.88) | 89.2 (0.9) |
| Embodiment 5 | 20 | 191 | 8.91 (0.27) | 6.32 (1.47) | 87.0 (1.3) |
| Embodiment 6 | 25 | 182 | 8.19 (0.10) | 6.53 (0.97) | 87.3 (2.3) |

Note: the PET volume replacement ratio is the volume ratio of replacing quartz powder with PET powder. The result of the test is the average of three specimens, and the value in brackets is the standard deviation of the result.

The flowability is the flowability test of fresh slurry (freshly mixed concrete slurry).

It may be seen from the above table that the ultimate tensile strains of Embodiment 3-Embodiment 6 doped with PET powder are better than the ultimate tensile strain of Embodiment 1 not doped with PET powder, and the axial tensile strengths of Embodiment 2-Embodiment 5 are better than the axial tensile strength of Embodiment 1, and Embodiment 5 is the best embodiment combining the two results. The compressive strengths of Embodiment 3-Embodiment 6 are lower than the compressive strength of Embodiment 1, while the compressive strength of Embodiment 2 is slightly higher than the compressive strength of Embodiment 1. In addition, it may be seen that the flowability of Embodiment 2-Embodiment 6 doped with PET powder is higher than the flowability of Embodiment 1 not doped with PET powder.

The better value range of PET volume replacement ratio is 15%-20%. Under this replacement ratio range, the flowability of fresh concrete may reach above 190 mm, the tensile strength may reach above 8.9 MPa, the ultimate tensile strain may reach above 6%, and the compressive strength may also be maintained at 87 MPa.

The optimal value of PET volume replacement ratio is 15%. Under this replacement ratio, the flowability of fresh concrete reaches the highest of 199 mm, the tensile strength reaches the highest of 9.12 MPa, which is 6.92% higher than the tensile strength of the control group, the ultimate tensile strain reaches 6.16%, and the compressive strength may also be maintained at 89.2 MPa.

Before the performance test, the shape and distribution of cracks may be observed by applying white paint on the surface of dog bone-like specimens, and the results are as follows.

TABLE 8

| Sample | PET volume replacement ratio/% | Ultimate tensile strain/% | Number of cracks | Average crack width/μm | Density of cracks/per millimeter (mm$^{-1}$) |
| --- | --- | --- | --- | --- | --- |
| Embodiment 1 | 0 | 5.69 | 17 | 214 | 0.21 |
| Embodiment 2 | 5 | 5.64 | 15 | 241 | 0.19 |
| Embodiment 3 | 10 | 6.36 | 23 | 177 | 0.29 |
| Embodiment 4 | 15 | 7.76 | 31 | 160 | 0.39 |
| Embodiment 5 | 20 | 7.80 | 32 | 156 | 0.40 |
| Embodiment 6 | 25 | 8.56 | 36 | 152 | 0.45 |

Figure 8:
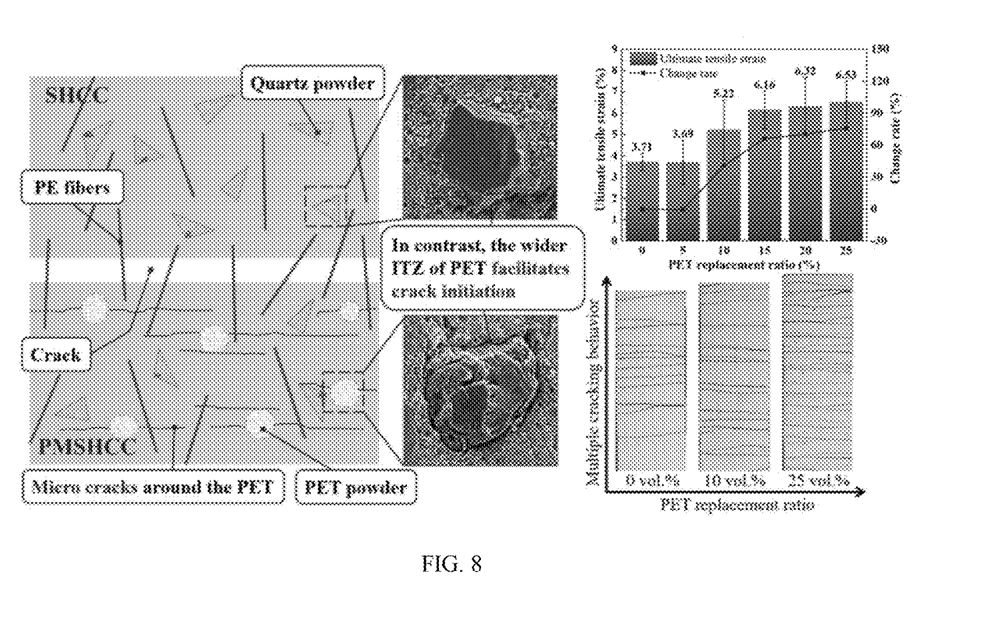
FIG. 8 shows an interaction principle between PET and matrix.

FIG. 8 shows the interaction principle between PET and matrix. Because there is a wider interface transition zone between PET and matrix, micro-defects may be created in cementitious composite (ECC) by introducing PET, so that ECC may expand more micro-cracks to enhance the deformation performance.

The above-mentioned embodiments only describe the preferred mode of the present disclosure, and do not limit the scope of the present disclosure. Under the premise of not departing from the design spirit of the present disclosure, various modifications and improvements made by one of ordinary skill in the art to the technical solution of the present disclosure should fall within the protection scope of the present disclosure.

What is claimed is:

1. A cementitious composite based on PET powder, wherein quartz powder aggregate in the cementitious composite is replaced with the PET powder at a volume replacement ratio of 10-20%;
   wherein the cementitious composite based on the PET powder consists of following raw materials in terms of unit volume mass:
   cement 936.7 kg/m$^3$;
   fly ash 401.4 kg/m$^3$;
   quartz powder 301.1-401.4 kg/m$^3$;
   PET powder 0-52.3 kg/m$^3$;
   water 335.1 kg/m$^3$;
   water reducer 5.4 kg/m$^3$;
   PE fiber 19.4 kg/m$^3$;
   thickener 0.54 kg/m$^3$; and
   defoamer 2.01 kg/m$^3$,
   wherein a dosage of the PET powder is not 0 kg/m$^3$; particle size grades of the PET powder and the aggregate are same; and particle sizes of the quartz powder and the PET powder are 20-310 μm.

2. The cementitious composite according to claim 1, wherein the cement is P.II 52.5R ordinary portland cement; and a particle size of the fly ash is 0-200 μm.

3. The cementitious composite according to claim 1, wherein the PE fiber has a density of 0.97 g/cm$^3$, a tensile strength of 3000 MPa, and an elastic modulus of 116 GPa.

4. The cementitious composite according to claim 1, wherein the water reducer is a polycarboxylate ether superplasticizer.

5. A preparation method of the cementitious composite according to claim 1, comprising a following step: mixing components of the raw materials to obtain the cementitious composite.

6. The preparation method according to claim 5, comprising following steps:
   mixing the cement, the fly ash, the quartz powder, the PET powder, the thickener and the defoamer to obtain a mixed material; mixing the water with the water reducer to obtain a mixed slurry; and
   adding the mixed slurry into the mixed material, and then adding the PE fiber to obtain the cementitious composite.

* * * * *